United States Patent
Chui

(10) Patent No.: US 7,911,677 B2
(45) Date of Patent: *Mar. 22, 2011

(54) MEMS SWITCH WITH SET AND LATCH ELECTRODES

(75) Inventor: Clarence Chui, San Mateo, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/240,931

(22) Filed: Sep. 29, 2008

(65) Prior Publication Data

US 2009/0086305 A1 Apr. 2, 2009

Related U.S. Application Data

(63) Continuation of application No. 11/234,826, filed on Sep. 23, 2005, now Pat. No. 7,446,927.

(60) Provisional application No. 60/613,501, filed on Sep. 27, 2004.

(51) Int. Cl.
*G02B 26/00* (2006.01)

(52) U.S. Cl. ........ 359/290; 359/223; 359/291; 359/292; 359/295; 359/298

(58) Field of Classification Search .................. 359/223, 359/224, 290–292, 295, 298, 847, 850, 872
See application file for complete search history.

(56) References Cited

U.S. PATENT DOCUMENTS

| | | |
|---|---|---|
| 4,425,572 A | 1/1984 | Takafuji et al. |
| 4,954,789 A | 9/1990 | Sampsell |
| 5,226,099 A | 7/1993 | Mignardi et al. |
| 5,367,878 A | 11/1994 | Muntz et al. |
| 5,578,976 A | 11/1996 | Yao |
| 5,619,061 A | 4/1997 | Goldsmith et al. |
| 5,638,946 A | 6/1997 | Zavracky |
| 5,784,189 A | 7/1998 | Bozler et al. |
| 5,867,302 A | 2/1999 | Fleming |
| 5,880,921 A | 3/1999 | Tham et al. |
| 5,946,176 A | 8/1999 | Ghoshal |
| 6,040,937 A | 3/2000 | Miles |
| 6,310,339 B1 | 10/2001 | Hsu et al. |
| 6,376,787 B1 | 4/2002 | Martin et al. |
| 6,529,654 B1 | 3/2003 | Wong et al. |
| 6,574,033 B1 | 6/2003 | Chui et al. |
| 6,614,581 B2 * | 9/2003 | Anderson ............ 359/295 |
| 6,625,047 B2 | 9/2003 | Coleman, Jr. |
| 6,674,562 B1 | 1/2004 | Miles |

(Continued)

FOREIGN PATENT DOCUMENTS

EP 0 706 164 4/1996

(Continued)

OTHER PUBLICATIONS

ISR and WO for PCT/US05/034370 filed Sep. 23, 2005.

(Continued)

*Primary Examiner* — Evelyn A. Lester

(74) *Attorney, Agent, or Firm* — Knobbe Martens Olson & Bear, LLP

(57) ABSTRACT

A MEMS device is electrically actuated with a voltage placed across a first electrode and a moveable material. The device may be maintained in an actuated state by latch electrodes that are separate from the first electrode.

27 Claims, 9 Drawing Sheets

U.S. PATENT DOCUMENTS

| | | | |
|---|---|---|---|
| 6,680,792 B2 | 1/2004 | Miles | |
| 6,710,908 B2 | 3/2004 | Miles et al. | |
| 6,787,438 B1 | 9/2004 | Nelson | |
| 6,813,060 B1 | 11/2004 | Garcia et al. | |
| 6,972,881 B1 | 12/2005 | Bassetti | |
| 7,034,783 B2 | 4/2006 | Gates et al. | |
| 7,123,216 B1 | 10/2006 | Miles | |
| 7,161,728 B2 | 1/2007 | Sampsell et al. | |
| 7,196,837 B2 | 3/2007 | Sampsell et al. | |
| 7,388,706 B2 | 6/2008 | Miles | |
| 7,400,489 B2 | 7/2008 | Van Brocklin et al. | |
| 7,446,927 B2 | 11/2008 | Chui | |
| 7,489,228 B2 | 2/2009 | Robert | |
| 2002/0000959 A1 | 1/2002 | Colgan et al. | |
| 2002/0050882 A1 | 5/2002 | Hyman et al. | |
| 2002/0097133 A1 | 7/2002 | Charvet et al. | |
| 2002/0126364 A1 | 9/2002 | Miles | |
| 2002/0149834 A1* | 10/2002 | Mei et al. | 359/295 |
| 2002/0179421 A1 | 12/2002 | Williams et al. | |
| 2003/0043157 A1 | 3/2003 | Miles | |
| 2003/0223176 A1 | 12/2003 | Fujii et al. | |
| 2004/0022044 A1 | 2/2004 | Yasuoka et al. | |
| 2004/0223204 A1 | 11/2004 | Mao et al. | |
| 2005/0116924 A1 | 6/2005 | Sauvante et al. | |
| 2005/0231791 A1 | 10/2005 | Sampsell et al. | |
| 2006/0067648 A1 | 3/2006 | Chui et al. | |
| 2006/0245030 A1 | 11/2006 | Pan | |

FOREIGN PATENT DOCUMENTS

| | | |
|---|---|---|
| EP | 1 146 533 | 10/2001 |
| EP | 1 343 190 | 9/2003 |
| WO | WO 03/060940 | 7/2003 |

OTHER PUBLICATIONS

Invitation to Pay Additional Fees for PCT/US05/041365 filed Nov. 16, 2005.

ISR and WO for PCT/US05/041365 filed Nov. 16, 2005.

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Peroulis et al., Low contact resistance series MEMS switches, 2002, pp. 223-226, vol. 1, IEEE MTT-S International Microwave Symposium Digest, New York, NY.

Office Action dated Apr. 6, 2007 in U.S. Appl. No. 11/234,826.

Office Action dated Sep. 27, 2007 in U.S. Appl. No. 11/234,826.

Official Communication dated Apr. 14, 2009 in European App. No. 05823340.4.

Office Action dated Sep. 25, 2009 in Chinese App. No. 200580052085.7.

Official Communication dated Jun. 9, 2010 in European App. No. 05823340.4.

Extended European Search Report dated Jun. 11, 2010 in App. No. 10162705.7.

Office Action dated Apr. 26, 2010 in Chinese App. No. 200580052085.7.

Notice of Reasons for Rejection dated Jun. 15, 2010 in Japanese App. No. 2008-541133.

* cited by examiner

MEMS SWITCH WITH SET AND LATCH ELECTRODES

CROSS REFERENCE TO RELATED APPLICATIONS

This application is a continuation of application Ser. No. 11/234,826, titled "MEMS Switch With Set And Latch Electrodes," filed Sep. 23, 2005, which claims priority to U.S. Provisional Application No. 60/613,501, titled "Interferometric Modulator Array With Integrated MEMS Electrical Switches," filed Sep. 27, 2004, which is hereby incorporated by reference, in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, the invention includes a MEMS device comprising a substrate with at least two support posts supported by the substrate. The device also includes at least two electrically isolated electrodes supported by the substrate and positioned between the support posts. The device further includes a moveable electrode supported above the substrate by the support posts, and at least two switch terminals that are selectably connectable depending on the position of the moveable electrode.

In another embodiment, the invention includes a method of operating a MEMS switch. The method includes controlling switch actuation by moving a moveable element from a first position to a second position by applying a first voltage across a first electrode and second electrode. The method also includes maintaining the moveable element in the second position by applying a second voltage across the first electrode and a third electrode.

In another embodiment, a MEMS switch includes a first electrode moveable between first and second positions and switch terminals selectably connectable based on a position of the moveable electrode. The switch also includes means for moving the moveable electrode from the first position to the second position, and means for maintaining the moveable electrode in the second position. The means for maintaining is separately controllable from the means for moving.

In another embodiment, the invention comprises a method of making a MEMS switch. The method includes forming at least first and second electrically isolated electrodes between a pair of support posts on a substrate, forming switch terminals, and forming a moveable electrode on said support posts.

In another embodiment, a display system comprises an array of MEMS display elements one or more MEMS switches coupled to the array. At least one of the MEMS switches comprises a substrate, at least two support posts supported by the substrate, and at least two electrically isolated electrodes supported by said substrate and positioned between the support posts. A moveable electrode is supported above the substrate by the support posts; and at least two switch terminals are provided that are selectably connectable depending on the position of the moveable electrode.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
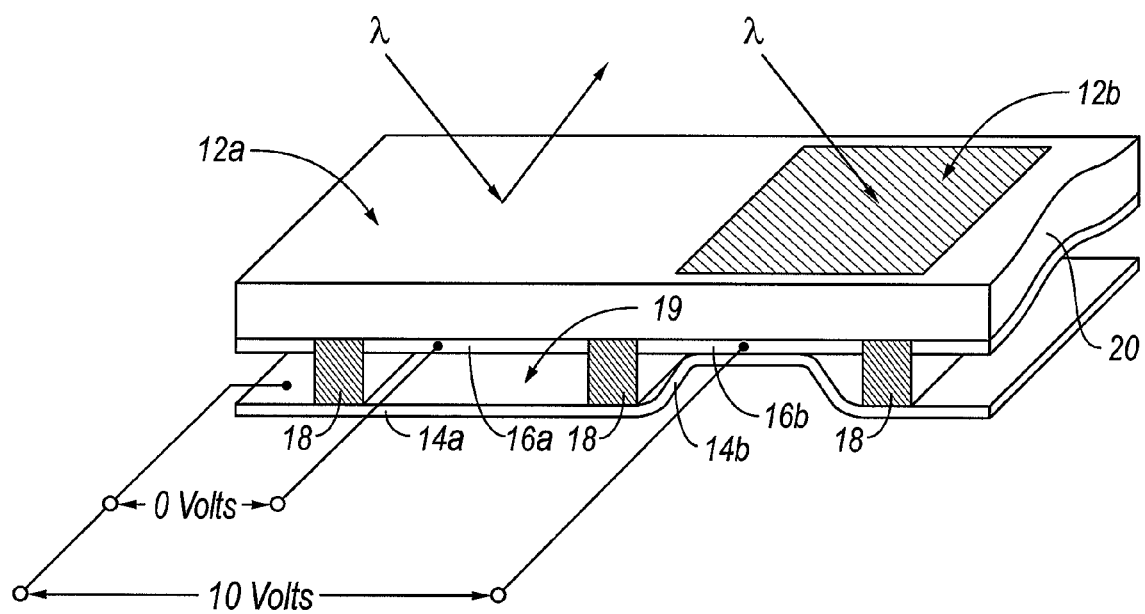
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
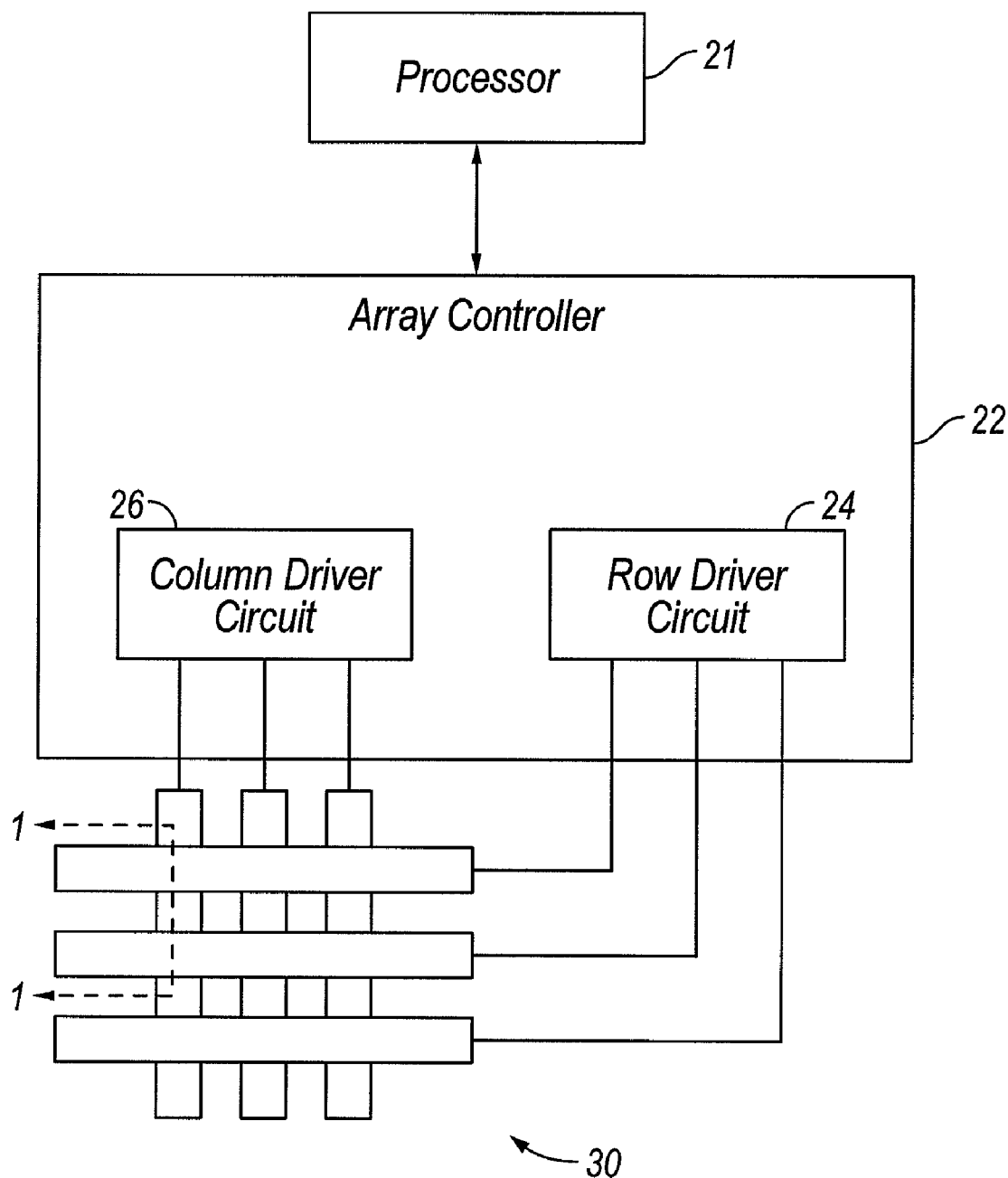
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
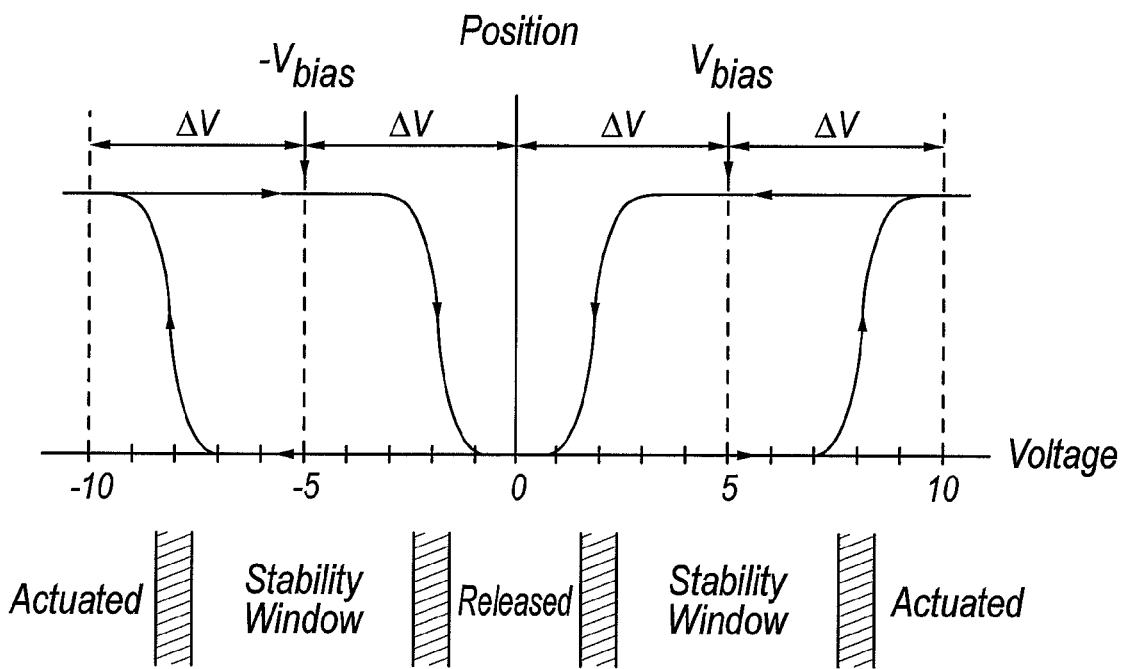
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
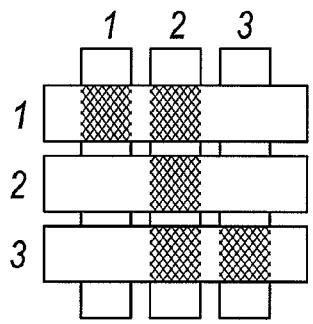
FIGS. 5A and 5B illustrate one exemplary timing diagram for row and column signals that may be used to write a frame of display data to the 3×3 interferometric modulator display of FIG. 2.
Figure 5B:
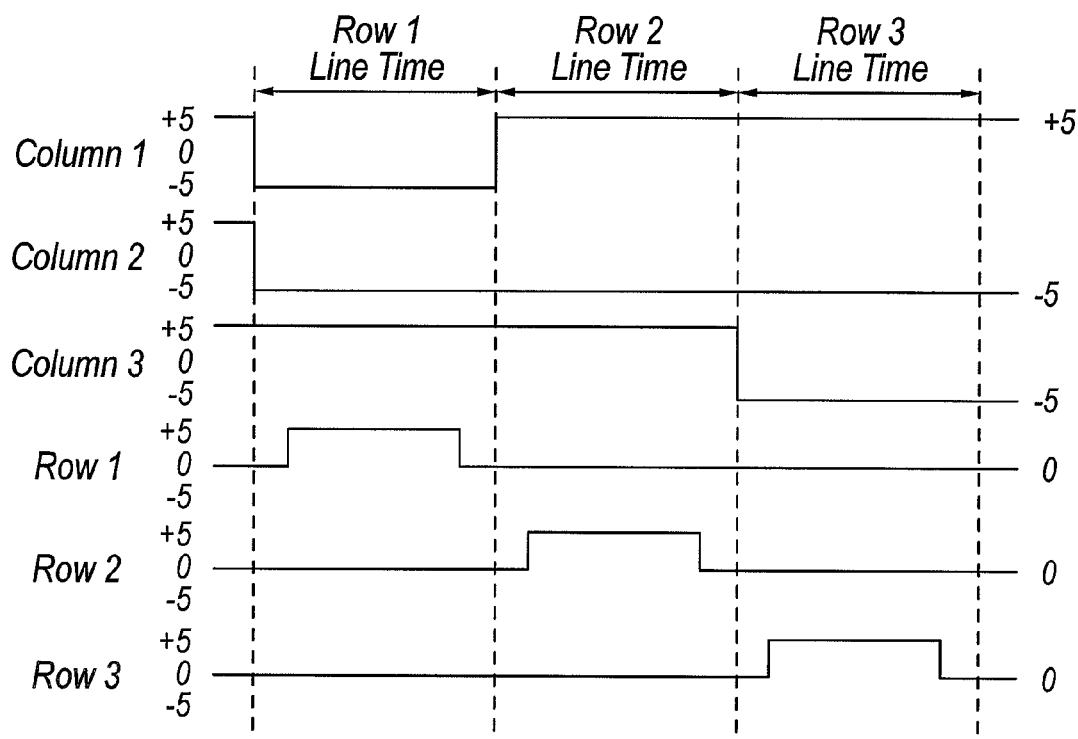

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
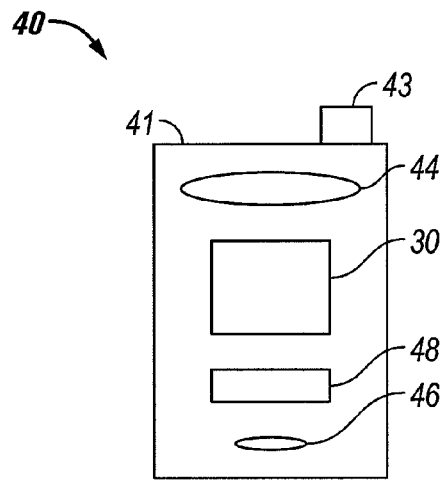
FIGS. 6A and 6B are system block diagrams illustrating an embodiment of a visual display device comprising a plurality of interferometric modulators.
Figure 6B:
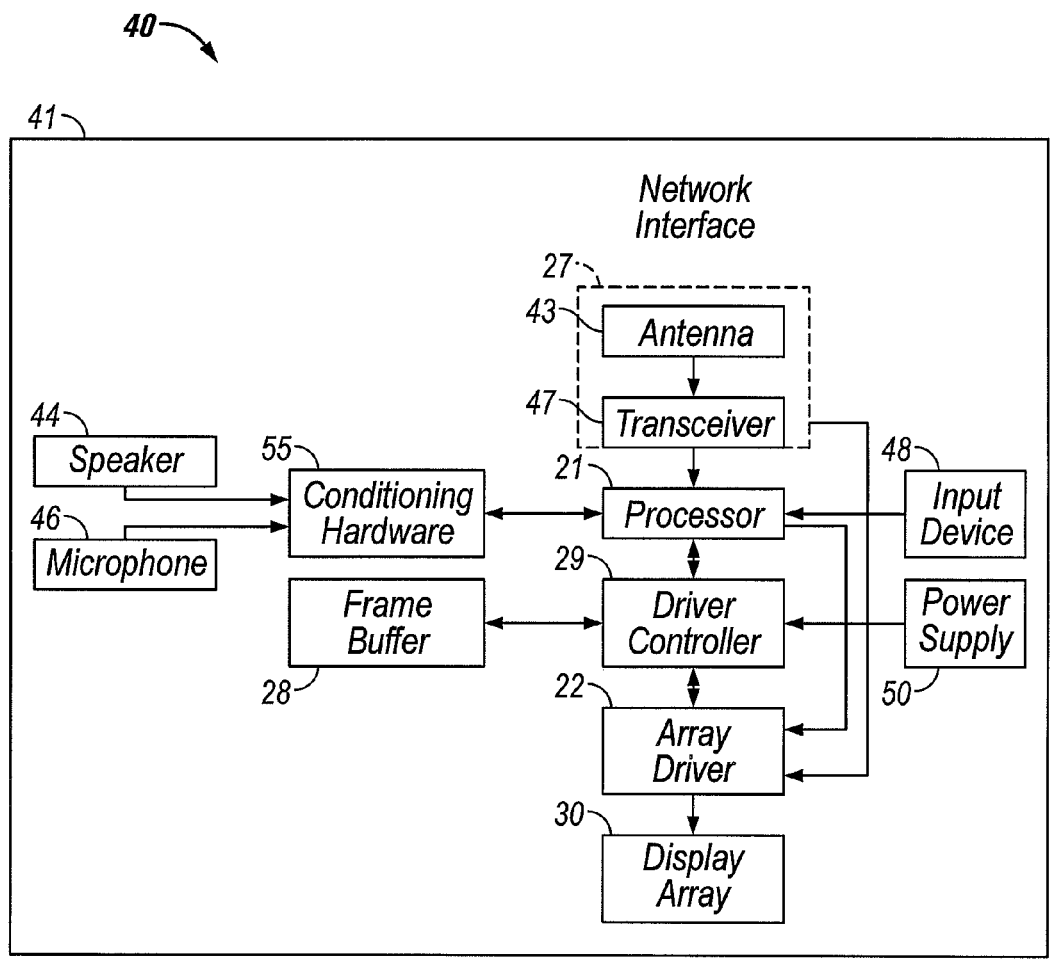

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
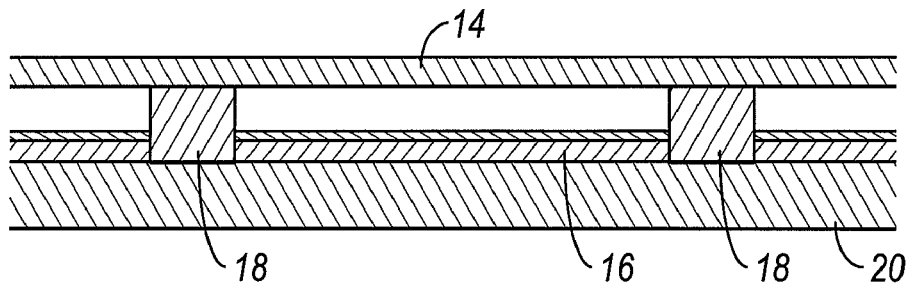
FIG. 7A is a cross section of the device of FIG. 1.
Figure 7B:
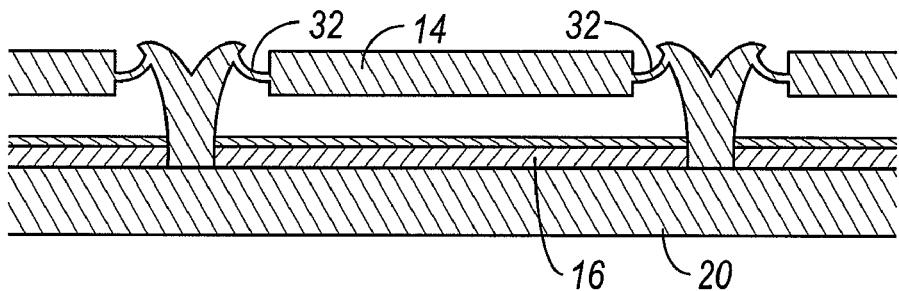
FIG. 7B is a cross section of an alternative embodiment of an interferometric modulator.
Figure 7C:
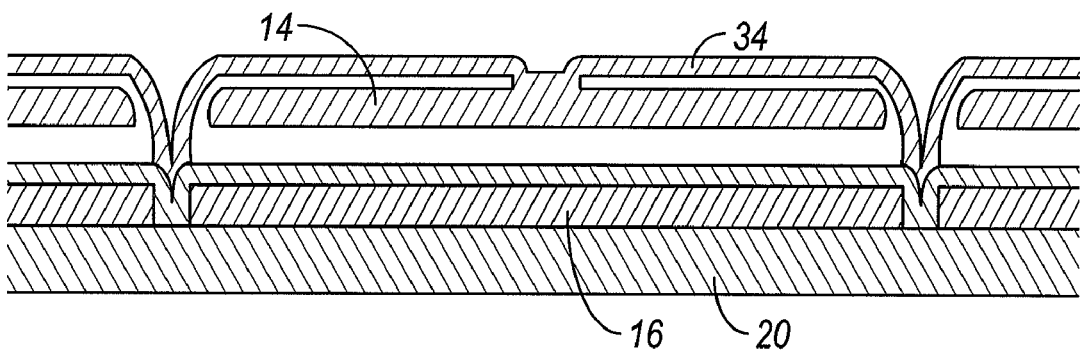
FIG. 7C is a cross section of another alternative embodiment of an interferometric modulator.
Figure 7D:
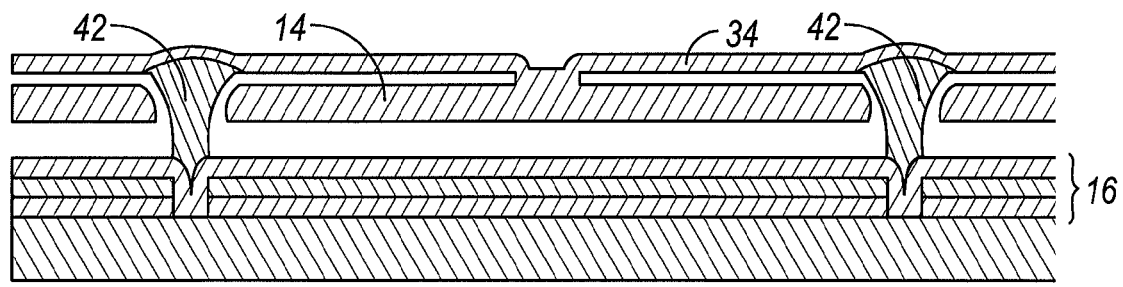
FIG. 7D is a cross section of yet another alternative embodiment of an interferometric modulator.
Figure 7E:
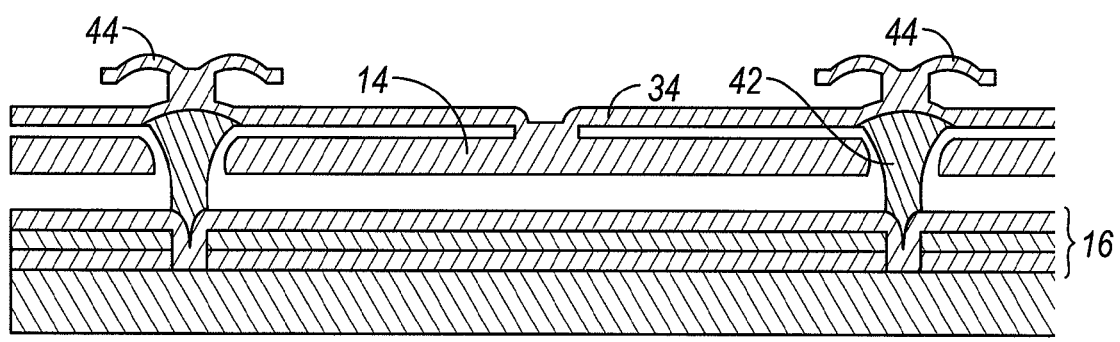
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

With some modifications the basic structure of an interferometric modulator can be used as a MEMS switch. MEMS switches built from the same basic structure as interferometric modulators ease the integration of logic and switching functions with interferometric modulator arrays. It is possible that the other types of switches may be integrated, such as switches fabricated in a manner not similar to the fabrication of the interferometric elements, and more conventional electronic switches fabricated using thin silicon films deposited on the glass substrate. However, because fabrication of interferometric modulator based MEMS switches may be performed using many of the same processing steps that are used in fabricating interferometric modulators, these MEMS switches may be inexpensively integrated onto the same substrate as an array of interferometric modulators used, for example, for a display.

For example, in one embodiment the MEMS switches and interferometric modulators may be fabricated using the same process, although extra steps may be performed on the interferometric modulators and/or the MEMS switches during the manufacturing process. For example, deposition and etching steps to add terminals to the MEMS switches are unnecessary for the fabrication of interferometric modulators. In such an embodiment some common steps would be performed, such as those for forming the electrodes, etc. The MEMS switch terminals would then be formed. After these steps would follow more steps necessary for both the interferometric modulators and the MEMS switches, thus providing a combined interferometric modulator and MEMS switch array. In yet another embodiment, the same process that is used for manufacturing interferometric modulators is used in manufacturing MEMS switches. The interferometric modulators may first be fabricated on a substrate, followed by fabrication of MEMS switches on the substrate. Similarly, MEMS switches may first be fabricated on a substrate, followed by fabrication of interferometric modulators on the substrate. In either case, the manufacturing process does not require significant modification as the MEMS switches comprise many of the same structures as the interferometric modulators.

In one embodiment, groups of these MEMS switches can be used to form logic blocks, which may be used for any purpose. These logic blocks comprising MEMS switches may be arranged together to provide logical and electrical functions typically found in externally attached components, thereby saving component cost. For example, MEMS switches may be arranged for use in various manners, such as in the capacity of low leakage transistors, shift registers, or demultiplexers, for example. In the context of a interferometric modulator, the above-described MEMS switches may be used in conjunction with row drivers or column drivers, for example. Advantageously, the MEMS switches described above may be manufactured on various substrates, such as glass, glass wafers, silicon wafers, or plastic substrates, for example.

Figure 8A:
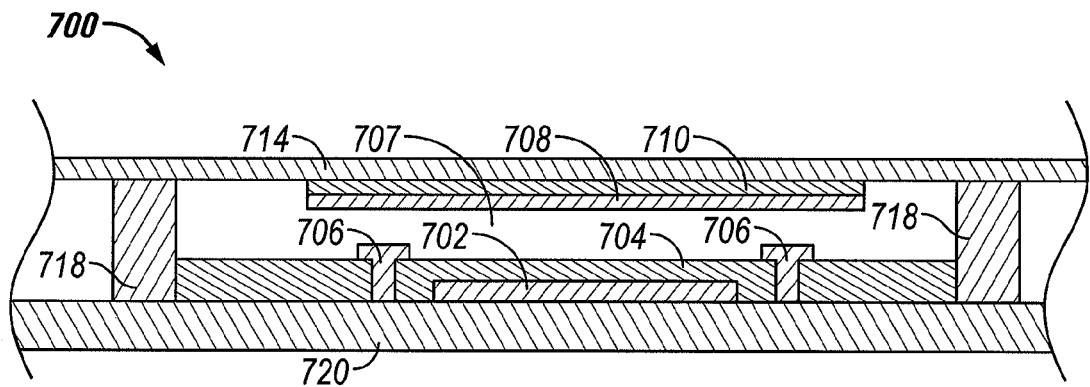
FIG. 8A is a cross section of a MEMS switch embodiment.

FIG. 8A is a cross-sectional side view of a MEMS switch 700. The MEMS switch 700 of FIG. 8A has similar collapsible cavity features as the interferometric modulator of FIG. 7A. The MEMS switch 700 additionally includes two terminals 706, an insulating layer 710, and a conductive strip 708. The MEMS switch 700 is a structure that provides selective electrical contact between the two terminals 706. More particularly, the MEMS switch 700 is considered closed when the terminals 706 are in electrical contact and the MEMS switch is considered open when the terminals 706 are not in electrical contact. In a mechanically relaxed state, terminals 706 are not in electrical contact and, thus, the MEMS switch 700 is open. As shown in FIG. 8A, the MEMS switch 700 comprises a moveable material 714, a conductive strip 708, and an insulating layer 710 between the moveable material 714 and the conductive strip 708. A substrate 720 supports an electrode 702, and an insulating layer 704 on the electrode 702. Two terminals 706, separated by a distance, are deposited on and/or through the insulating layer 704. The terminals 706 may connect to other circuitry using vias through insulating layer 704 and/or electrode 702. Insulating layer 704 and moveable material 714 are mechanically separated by supports 718 in order to define a cavity 707. As described above with respect to interferometric modulators, the moveable material 714 is deformable, such that the moveable material 714 may be deformed towards the substrate 720 when a voltage difference is applied across the moveable material 714 and the electrode 702. This is analogous to the reflective material 14, substrate 20, and electrode 16 of FIG. 7A, and to the reflective layers 14a and 14b, the transparent substrate 20, and the reflective layers 16a and 16b of FIG. 1. The moveable material 714 may have on it an insulator 710, which has upon it the conductive strip 708. The conductive strip 708 is aligned so that when the moveable material 714 is deflected towards the substrate 720 by an applied potential as described above, the conductive strip 708 contacts both of the terminals 706, causing the terminals 706 to be in electrical contact and the MEMS switch 700 to be closed. In this embodiment, the conductive strip 708 is electrically isolated from the moveable material 714 by insulator 710 so that contact between the terminals 706 and the movable material 714 does not disturb the voltage difference applied across the moveable material 714 and the electrode 702. In some embodiments, where such isolation is not necessary, the conductive strip 708 and the insulator 710 will not be needed, and the moveable material itself 714 can function as the conductor that bridges the two terminals 706. When the voltage applied across the moveable material 714 and the electrode 702 is reduced below a certain level (as is also described above), the moveable material 714 returns to its mechanically relaxed state and the MEMS switch 700 is opened.

Figure 8B:
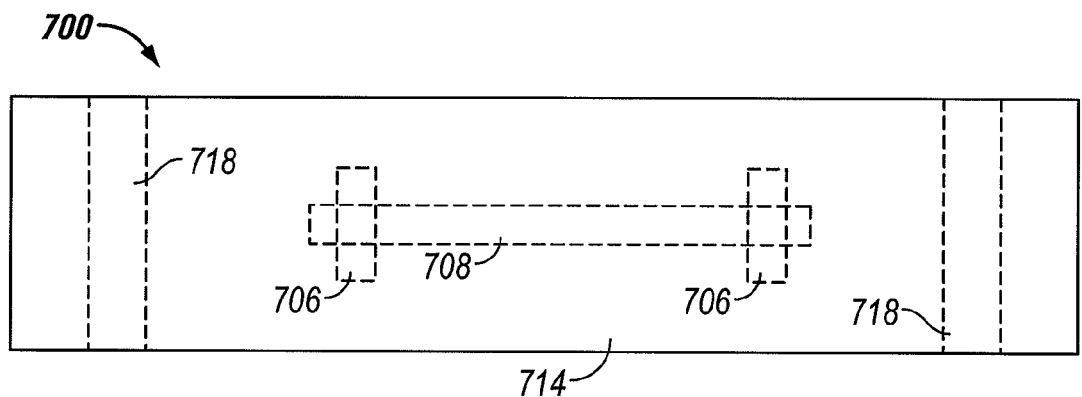
FIG. 8B is a top view of the switch embodiment of FIG. 8A

FIG. 8B is a top view of MEMS switch 700. The supports 718, the conductive strip 708, and the terminals 706 are shown as seen looking through the moveable material 714. Conductive strip 708 may be significantly smaller than the moveable material 714. This is to ensure that the electromotive force between the moveable material 714 and the electrode 702 is larger than the electromotive force between the conductive strip 708 and the electrode 702 because once the strip contacts the electrodes, the potential on the strip may differ from the potential on the moveable material.

Figure 9:
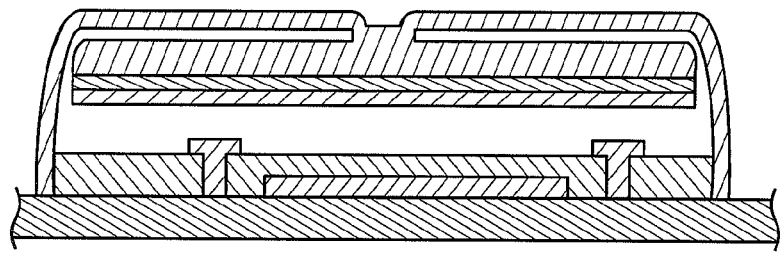
FIG. 9 is a cross section of another MEMS switch embodiment.

FIG. 9 is a cross-sectional side view of a MEMS switch 800 of another embodiment. MEMS switch 800 has similar constructional features as the interferometric modulator of FIG. 7C. It also has MEMS switch functionality and features similar to those of MEMS switch 700 in FIG. 8A.

Figure 10:
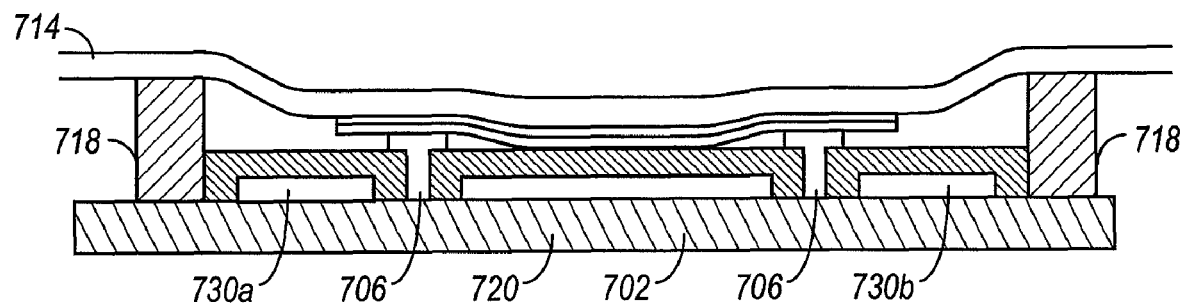
FIG. 10 is a cross section of another MEMS switch embodiment.

FIG. 10 is a cross-sectional side view of another MEMS electrical switch that is similar to the switch of FIG. 8, except for the addition of "latch" electrodes 730a, 730b on the substrate, that are described in further detail below. In FIG. 10, the switch is shown in the actuated position with the moveable material 714 deformed down onto the terminals 706.

In operation, a relatively low voltage is initially applied to electrodes 730a, 730b, creating a voltage difference between the electrodes 730a, 730b and the moveable material 714. In advantageous embodiments of this design, this voltage difference is not of sufficient magnitude to cause the moveable material 714 to deform from the relaxed state into the actuated state, but is sufficient to maintain the moveable material in the actuated state once it is placed in that state. Subsequently, a voltage is applied to electrode 702 that creates a voltage difference between the moveable material 714 and the electrode 702 that is of sufficient magnitude to cause the moveable material to collapse towards the electrode 702. After the device is actuated by this applied voltage, the voltage on electrode 702 may be removed. Because of the close proximity of the moveable material 714 and the electrodes 730a, 730b, the moveable material 714 may then be maintained in the collapsed position by the voltage difference between the electrodes 730a, 730b and the moveable material 714 even though the voltage applied to the latch electrodes 730a, 730b is not high enough to actuate the device from the fully relaxed initial state. In one embodiment, the voltage applied to latch electrodes 730a, 730b is in the range of 1-10 volts, while the voltage applied to electrode 702 is in the range of 5-15 volts. It will be appreciated that the latch voltage could be applied after the set voltage. It will also be appreciated that the location of the various components shown in FIG. 10 can be varied widely. For example, the switch terminals 706 could be placed between the support posts and the latch electrodes. The latch electrodes may extend further toward and/or under the support posts. In addition, only one, or more than two latch electrodes could be provided. The important feature is that the latch electrode(s) be placed in a position that provides the latch function. In the embodiment, of FIG. 10, it is advantageous to have at least a portion of the latch electrodes placed beneath the point where the moveable material forms a corner and first contacts the substrate.

Figure 11:
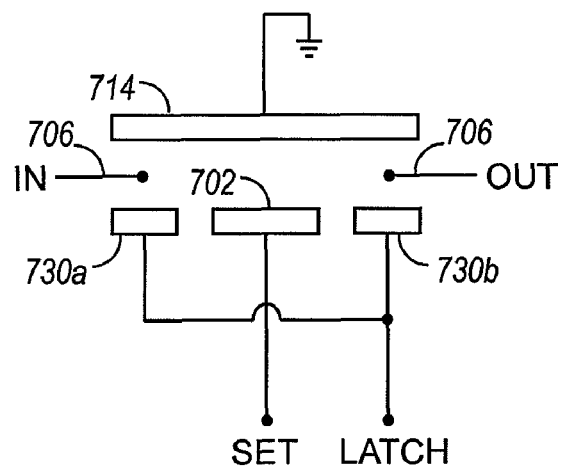
FIG. 11 is a schematic/block diagram of the switch embodiment of FIG. 10.

FIG. 11 illustrates a schematic/block diagram of this switch embodiment. A SET signal is applied to electrode 702 and a LATCH signal is applied to electrodes 730A and 730b. The LATCH signal may be a lower voltage than the SET signal. Once LATCH is asserted, the SET signal can be asserted to close the switch. De-asserting the SET signal does not relax the device and open the switch unless the LATCH signal is also removed. With this design, a group of switches can be configured as desired by asserting a common LATCH signal and using a defined group of SET signals routed to individual central electrodes, after which the SET signals can take on any value without changing the switch states. The entire group can be cleared simultaneously by de-asserting all SET and LATCH signals.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A MEMS switch device comprising:
    a set electrode;
    an electrostatically moveable electrode, configured to actuate to an actuated position based on electrostatic attraction between the moveable electrode and the set electrode;
    at least two switch terminals that are selectably electrically connected to each other or disconnected from each other based at least in part on the position of the moveable electrode; and
    a latch electrode, wherein the moveable electrode is configured to be maintained in substantially the actuated position based on electrostatic attraction between the moveable electrode and the latch electrode.

2. The MEMS device of claim 1, further comprising a substrate, wherein the substrate and the moveable electrode form a collapsible cavity, the cavity being collapsed based on the position of the moveable electrode.

3. A display system comprising:
    an array of MEMS display elements; and
    one or more MEMS switches coupled to the array, wherein at least one of the MEMS switches comprises:
    a set electrode;
    an electrostatically moveable electrode, configured to actuate to an actuated position based on electrostatic attraction between the moveable electrode and the set electrode;

at least two switch terminals that are selectably electrically connected to each other or disconnected from each other based at least in part on the position of the moveable electrode; and a latch electrode, wherein the moveable electrode is configured to be maintained in substantially the actuated position based on electrostatic attraction between the moveable electrode and the latch electrode.

4. The MEMS device of claim 3, further comprising a substrate, wherein the substrate and the moveable electrode form a collapsible cavity, the cavity being collapsed based on the position of the moveable electrode.

5. The display system of claim 4, wherein at least one of the display elements comprises another moveable electrode, wherein the substrate and the other moveable electrode form another collapsible cavity, the other cavity being collapsed based on the position of the other moveable electrode.

6. The MEMS device of claim 3, wherein the set electrode is in a central region between two support posts.

7. The MEMS device of claim 6, wherein the latch electrode is positioned between the central region and one of the support posts.

8. The MEMS device of claim 6, wherein the latch electrode is positioned between one of the switch terminals and one of the support posts.

9. The MEMS device of claim 3, wherein the set electrode is in a central region of the device, and the latch electrode is electrically isolated from the set electrode.

10. The MEMS device of claim 4, wherein the switch terminals are supported by the substrate.

11. The MEMS device of claim 4, wherein the switch terminals are connected when the moveable electrode is positioned proximate to the substrate.

12. The display system of claim 3, further comprising:
a processor that is in electrical communication with the display, the processor being configured to process image data; and
a memory device in electrical communication with the processor.

13. The display system of claim 12, additionally comprising a driver circuit coupled to the array.

14. The device of claim 13, wherein the driver circuit is configured to send at least one signal to the display.

15. The device of claim 14, further comprising:
a controller configured to send at least a portion of the image data to the driver circuit.

16. The device of claim 12, further comprising:
an image source module configured to send the image data to the processor.

17. The device of claim 16, wherein the image source module comprises at least one of a receiver, transceiver, and transmitter.

18. The device of claim 12, further comprising:
an input device configured to receive input data and to communicate the input data to the processor.

19. A method of operating a MEMS switch comprising:
electrically connecting to each other or disconnecting from each other first and second electrical components by moving an electrostatically moveable element from a first position to a second position by applying a first voltage across a set electrode and the moveable element, the first voltage establishing an electrostatic attraction between the set electrode and a central portion of the moveable element; and maintaining the moveable element in the second position by applying a second voltage across the moveable element and a latch electrode, the second voltage establishing an electrostatic attraction between the latch electrode and the moveable element, respectively.

20. The method of claim 19, wherein the second voltage is less than the first voltage.

21. A method of making a MEMS switch comprising:
forming switch terminals between a pair of support posts on a substrate;
forming an electrostatically moveable electrode on the support posts; and
forming a latch electrode between the support posts adjacent the moveable electrode; and
forming a set electrode between the support posts adjacent the moveable electrode,
wherein the moveable electrode is configured to actuate to an actuated position based on electrostatic attraction between the moveable electrode and the set electrode, and is configured to be maintained in substantially the actuated position based on electrostatic attraction between the moveable electrode and the latch electrode, and wherein the moveable electrode is configured to electrically connect the switch terminals to each other when in the actuated position and disconnect the switch terminals from each other when no in the actuated position.

22. The method of claim 21, comprising forming the set electrode in a central region of the MEMS switch.

23. The method of claim 21, comprising forming the latch electrode between the central region and one of the support posts, the latch electrode being electrically isolated from the set electrode.

24. A MEMS switch made with the method of claim 21.

25. A MEMS switch comprising:
means for electrically connecting to each other or disconnecting from each other first and second electrical components, wherein the electrically connecting or disconnecting means is configured to move from a first position to a second position;
means for moving the electrically connecting or disconnecting means from the first position to the second position, the moving means being configured to apply a first voltage across a set electrode and the electrically connecting or disconnecting means, the first voltage establishing an electrostatic attraction between the set electrode and a central portion of the electrically connecting or disconnecting means; and
means for maintaining the electrically connecting or disconnecting means in the second position, the maintaining means being configured to apply a second voltage across the electrically connecting or disconnecting means and a latch electrode, the second voltage establishing an electrostatic attraction between the latch electrode and the electrically connecting or disconnecting means, respectively.

26. The MEMS switch of claim 25, wherein the moving means comprises a first electrode.

27. The MEMS switch of claim 25, wherein the maintaining means comprises a second electrode.

* * * * *